United States Patent
Yu

(10) Patent No.: US 10,869,230 B2
(45) Date of Patent: Dec. 15, 2020

(54) ACCESS CONTROL METHOD AND APPARATUS FOR SERVICE IN BROADBAND CLUSTER SYSTEM, AND CLUSTER TERMINAL

(71) Applicant: Hytera Communications Corporation Limited, Guangdong (CN)

(72) Inventor: Qingxiang Yu, Guangdong (CN)

(73) Assignee: Hytera Communications Corporation Limited, Guangdong (CN)

( * ) Notice: Subject to any disclaimer, the term of this patent is extended or adjusted under 35 U.S.C. 154(b) by 164 days.

(21) Appl. No.: 15/738,309

(22) PCT Filed: Jun. 24, 2015

(86) PCT No.: PCT/CN2015/082198
§ 371 (c)(1),
(2) Date: Dec. 20, 2017

(87) PCT Pub. No.: WO2016/206014
PCT Pub. Date: Dec. 29, 2016

(65) Prior Publication Data
US 2018/0176831 A1 Jun. 21, 2018
US 2018/0376377 A9 Dec. 27, 2018

(51) Int. Cl.
*H04L 12/24* (2006.01)
*H04L 5/14* (2006.01)
(Continued)

(52) U.S. Cl.
CPC .......... *H04W 28/24* (2013.01); *H04W 48/06* (2013.01); *H04W 74/0833* (2013.01); *H04W 48/12* (2013.01)

(58) Field of Classification Search
CPC . H04W 24/02; H04W 48/10; H04W 74/0833; H04W 48/06; H04L 28/24; H04L 47/10; H04L 47/22
See application file for complete search history.

(56) References Cited

U.S. PATENT DOCUMENTS 7,260,092 B2 * 8/2007 Dally ................. H04Q 3/68
370/369
9,456,454 B2 * 9/2016 Gao .................. H04W 72/1268
(Continued)

FOREIGN PATENT DOCUMENTS

CN 101001448 A 7/2007
CN 101090527 A 12/2007
(Continued)

OTHER PUBLICATIONS

Method for accessing radio communication system using different random heuristic data packet (Year: 2007).*
(Continued)

*Primary Examiner* — Faruk Hamza
*Assistant Examiner* — Abusayeed M Haque
(74) *Attorney, Agent, or Firm* — Wolf, Greenfield & Sacks, P.C.

(57) ABSTRACT

A service access control method, a service access control apparatus and a cluster terminal for a broadband cluster system are provided. The method includes: determining a service type of a to-be-accessed service, the service type including a service with a low delay requirement, determining whether a current subframe meets a preset access condition for a service with a low delay requirement when it is determined that the to-be-accessed service is the service with the low delay requirement, and completing access of the to-be-accessed service if the current subframe meets the preset access condition for the service with the low delay requirement.

17 Claims, 3 Drawing Sheets

(51) Int. Cl.
*H04W 84/18* (2009.01)
*H04L 29/06* (2006.01)
*H04W 28/24* (2009.01)
*H04W 48/06* (2009.01)
*H04W 74/08* (2009.01)
*H04W 48/12* (2009.01)

(56) References Cited

U.S. PATENT DOCUMENTS

| | | | | |
|---|---|---|---|---|
| 9,532,383 | B2* | 12/2016 | Lee | H04W 74/0833 |
| 9,602,370 | B2* | 3/2017 | Golani | H04L 43/08 |
| 2008/0310518 | A1* | 12/2008 | Song | H04L 65/607 |
| | | | | 375/240.27 |
| 2010/0248643 | A1* | 9/2010 | Aaron | H04L 1/0002 |
| | | | | 455/68 |
| 2011/0103292 | A1* | 5/2011 | Pasad | H04L 5/0053 |
| | | | | 370/315 |
| 2011/0258670 | A1* | 10/2011 | Baek | H04N 21/6408 |
| | | | | 725/87 |
| 2012/0275305 | A1 | 11/2012 | Lin | |
| 2013/0089051 | A1* | 4/2013 | Bai | H04W 52/367 |
| | | | | 370/329 |
| 2013/0308541 | A1 | 11/2013 | Mao et al. | |
| 2014/0029536 | A1* | 1/2014 | Tian | H04W 28/24 |
| | | | | 370/329 |
| 2015/0264359 | A1* | 9/2015 | Vanam | H04N 19/46 |
| | | | | 375/240.27 |
| 2018/0270732 | A1* | 9/2018 | Garcia Martin | H04W 36/245 |

FOREIGN PATENT DOCUMENTS

| | | |
|---|---|---|
| CN | 102088662 A | 6/2011 |
| CN | 102612112 A | 7/2012 |
| CN | 103634915 A | 3/2014 |
| CN | 103687045 A | 3/2014 |
| CN | 103796276 A | 5/2014 |
| EP | 2 890 203 A1 | 7/2015 |

OTHER PUBLICATIONS

First Office Action for Chinese Application No. 201580000289.X, dated Jan. 28, 2019.
CN201580000289.X, Jan. 28, 2019, First Office Action.
International Search Report and Written Opinion for Application No. PCT/CN2015/082198 dated Mar. 11, 2016.

* cited by examiner

ACCESS CONTROL METHOD AND APPARATUS FOR SERVICE IN BROADBAND CLUSTER SYSTEM, AND CLUSTER TERMINAL

CROSS-REFERENCE TO RELATED APPLICATIONS

The present application is a National Stage application of PCT international patent application No. PCT/CN2015/082198 filed on Jun. 24, 2015, the entire of which is incorporated herein by reference.

FIELD

The present disclosure relates to the technical field of cluster communication, and in particular to a service access control method, a service access control apparatus and a cluster terminal, for a broadband cluster system.

BACKGROUND

In a broadband cluster system, most cluster terminals may be in an idle state. That is, the cluster terminals neither access to the network nor interact with a base station for services. When a certain cluster terminal is to process a service, the cluster terminal firstly needs to access to the network.

Practically, when a large quantity of cluster terminals are to process services simultaneously, they may simultaneously transmit requests for accessing to the network. Since the broadband resources are limited, such phenomenon may undoubtedly cause network congestion and may further result in that a service with a high delay requirement cannot be processed in time.

SUMMARY

In view of the above, a service access control method, a service access control apparatus and a cluster terminal for a broadband cluster system are provided according to the present disclosure.

A service access control method for a broadband cluster system is provided according to the present disclosure. The method includes:

determining a service type of a to-be-accessed service, where the service type includes a service with a low delay requirement;

judging, in a case that it is determined that the to-be-accessed service is a service with a low delay requirement, whether a current sub-frame meets a preset access condition for the service with the low delay requirement; and completing access of the to-be-accessed service in a case that the current sub-frame meets the access condition for the service with the low delay requirement.

Preferably, the judging whether the current sub-frame meets the preset access condition for the service with the low delay requirement includes:

judging whether the current sub-frame is a random access sub-frame; and judging, in a case that it is determined that the current sub-frame is the random access sub-frame, whether the current sub-frame allows access of the service with the low delay requirement.

Preferably, the judging whether the current sub-frame allows the access of the service with the low delay requirement includes:

judging, for the current sub-frame, whether there is a code channel allowing the access of the service with the low delay requirement.

Preferably, the method further includes:

completing, in a case that it is determined that the to-be-accessed service is not the service with the low delay requirement, the access of the to-be-accessed service directly.

Preferably, before the determining the service type of the to-be-accessed service, the method further includes:

receiving service types respectively set for services, where the service types of the services are set based on different delay requirements of the services, where the determining the service type of the to-be-accessed service includes:

determining the service type of the to-be-accessed service based on the service types respectively set for the services.

A service control access apparatus for a broadband cluster system is further provided according to the present disclosure. The apparatus includes:

a determining module configured to determine a service type of a to-be-accessed service, where the service type includes a service with a low delay requirement;

a judging module configured to judge, in a case that it is determined that the to-be-accessed service is a service with a low delay requirement, whether a current sub-frame meets a preset access condition for the service with the low delay requirement; and a first access module configured to complete access of the to-be-accessed service in a case that the current sub-frame meets the access condition for the service with the low delay requirement.

Preferably, the judging module includes:

a first judging sub-module configured to judge whether the current sub-frame is a random access sub-frame; and a second judging sub-module configured to judge, in a case that it is determined that the current sub-frame is the random access sub-frame, whether the current sub-frame allows access of the service with the low delay requirement.

Preferably, the second judging sub-module is configured to judge, for the current sub-frame, whether there is a code channel allowing the access of the service with the low delay requirement.

Preferably, the apparatus further includes:

a second access module configured to directly complete, in a case that it is determined that the to-be-accessed service is not the service with the low delay requirement, the access of the to-be-accessed service.

Preferably, the apparatus further includes:

a receiving module configured to receive service types respectively set for services, where the service types of the services are set based on different delay requirements of the services, where the determining module is configured to determine the service type of the to-be-accessed service based on the service types respectively set for the services.

A cluster terminal for a broadband cluster system is further provided according to the present disclosure. The cluster terminal includes a processor and a memory, where the memory is configured to store program codes and transmit the program codes to the processor; and the processor is configured to perform, in response to instructions in the program codes, steps of: determining a service type of a to-be-accessed service, where the service type includes a service with a low delay requirement; judging, in a case that it is determined that the to-be-accessed service is a service with a low delay requirement, whether a current sub-frame meets a preset access condition for the service with the low delay requirement; and completing access of the to-be-accessed service in a case that the current sub-frame meets the access condition for the service with the low delay requirement.

In the present disclosure, a service type of a to-be-accessed service is determined firstly, and the service type includes a service with a low delay requirement. It is judged whether a current sub-frame meets a preset access condition for a service with a low delay requirement if it is determined that the to-be-accessed service is the service with the low delay requirement. Access of the to-be-accessed service is completed if the current sub-frame meets the preset access condition for the service with the low delay requirement. Compared with conventional technologies, in the present disclosure, an access time instant of the service with low delay requirement is controlled based on a characteristic that access of the service with the low delay requirement is allowed to be delayed. In this way, broadband resources are preferentially provided for a service with a high delay requirement to ensure timely access of the service with the high delay requirement, thereby avoiding network congestion caused by simultaneously transmitting requests for accessing to a network by a large quantity of cluster terminals and processing the service with the high delay requirement timely.

BRIEF DESCRIPTION OF THE DRAWINGS

The technical solutions according to the embodiments of the present disclosure or according to the conventional technologies will become clearer, since the drawings to be used in the description of the embodiments or the conventional technologies are briefly described below. Apparently, the drawings in the following description only illustrate some embodiments of the present disclosure, and other drawings may be obtained by those skilled in the art according to these drawings without any creative work.

DETAILED DESCRIPTION OF EMBODIMENTS

Hereinafter, the technical solutions according to the embodiments of the present disclosure will be described clearly and completely in conjunction with the drawings in the embodiments of the present disclosure. Apparently, the described embodiments are only a few rather than all of embodiments of the present disclosure. Any other embodiments obtained by those skilled in the art based on the embodiments of the present disclosure without any creative work fall within the scope of protection of the disclosure.

In a broadband cluster system, services to be accessed to a network for a cluster terminal include a service with a high delay requirement and a service with a low delay requirement. The service with the high delay requirement has a high requirement on delay, such as a cluster call service. The service with the low delay requirement has a low requirement on delay, such as a video uploading service and an auxiliary information (such as GPS position information) uploading service. In the broadband cluster system, timely access of the service with the high delay requirement should be ensured, while access of the service with the low delay requirement is allowed to be delayed.

According to the embodiments of the present disclosure, based on the characteristic that the access of the service with the low delay requirement is allowed to be delayed, an access time instant of the service with the low delay requirement is controlled. In this case, broadband resources are preferentially provided for the service with the high delay requirement, thereby ensuring timely access of the service with the high delay requirement.

Figure 1:
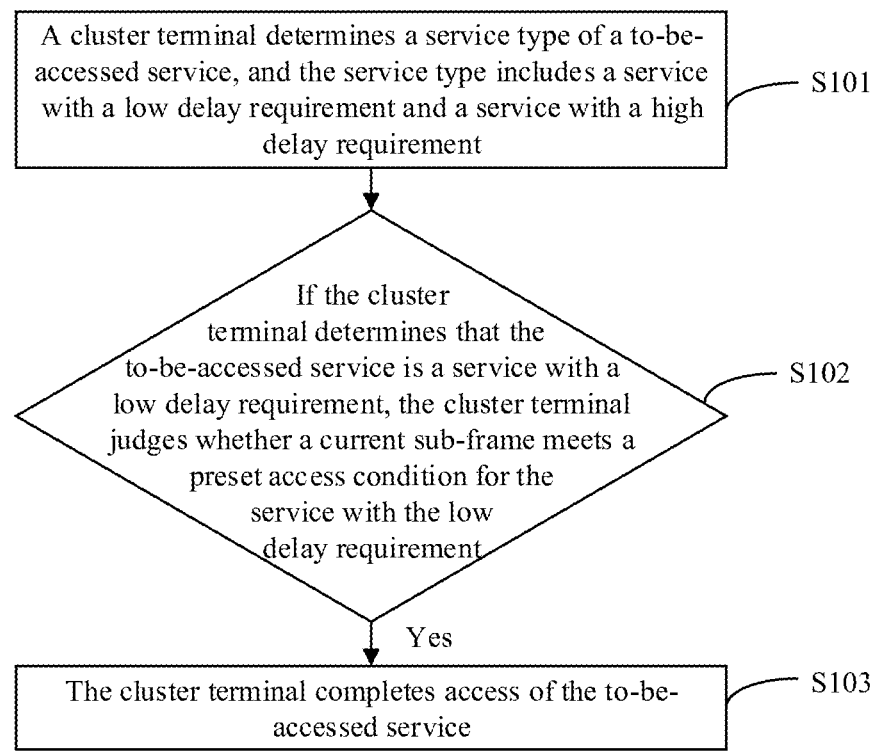
FIG. 1 is a flow chart of a service access control method for a broadband cluster system according to an embodiment of the present disclosure.

Reference is made to FIG. 1, which is a flow chart of a service access control method for a broadband cluster system according to an embodiment of the present disclosure. The method includes steps S101 to S103.

In step S101, a cluster terminal determines a service type of a to-be-accessed service. The service type includes a service with a low delay requirement and a service with a high delay requirement.

In the embodiment, a base station in the broadband cluster system transmits related parameters for random access to cluster terminals by broadcasting a system message. The cluster terminals acquire the related parameters for random access by receiving the system message broadcasted by the base station. Then, the cluster terminal configures its random access by utilizing the received related parameters for random access, and validates the configuration of the random access, for example, validates a sub-frame position of the random access.

Once the cluster terminal in the broadband cluster system needs to perform a service, the access of the service is completed firstly. The cluster terminal in the embodiment may be an interphone. Specifically, the cluster terminal firstly determines the service type of the to-be-accessed service and the service type is preset.

In the embodiment, the cluster terminal may determine in real time the service type of the to-be-accessed service, based on different delay requirements of the services. For example, a cluster call is determined as a service with a high delay requirement, and cluster video uploading, auxiliary information uploading and the like are determined as services with a low delay requirement.

In step S102, if the cluster terminal determines that the to-be-accessed service is a service with a low delay requirement, the cluster terminal judges whether a current sub-frame meets a preset access condition for the service with the low delay requirement.

In the broadband cluster system, the cluster terminal may properly control the access time instant of the service with the low delay requirement since the service with low delay requirement has the low requirement on delay. Specifically, the cluster terminal in the embodiment of the present disclosure controls the access time instant of the service with the low delay requirement by presetting an access condition that can limit the service with the low delay requirement.

In a practical application, the preset access condition for the service with the low delay requirement includes that the current sub-frame is a random access sub-frame and the current sub-frame allows access of the service with the low delay requirement. Specifically, the condition that the current sub-frame allows the access of the service with the low delay requirement may be that there is a code channel allowing the access of the service with the low delay requirement for the current sub-frame.

Firstly, the cluster terminal may judge whether the current sub-frame is a random access sub-frame. If it is determined that the current sub-frame is the random access sub-frame, it is further judged whether the current sub-frame allows the access of the service with the low delay requirement. In addition, whether the current sub-frame allows the access of the service with the low delay requirement may be judged by judging whether there is a code channel allowing the access of the service with the low delay requirement for the current sub-frame.

In step S103, if the current sub-frame meets the access condition for the service with the low delay requirement, the cluster terminal completes the access of the to-be-accessed service.

In the embodiment, if the cluster terminal determines that the current sub-frame meets the preset access condition for the service with the low delay requirement, the cluster terminal transmits a network access request to the base station by generating a random access preamble.

In the embodiment of the present disclosure, the cluster terminal firstly determines a service type of a to-be-accessed service. The service type includes a service with a low delay requirement and a service with a high delay requirement. The cluster terminal judges whether a current sub-frame meets a preset access condition for a service with a low delay requirement if the cluster terminal determines that the to-be-accessed service is the service with the low delay requirement. The cluster terminal completes access of the to-be-accessed service if the current sub-frame meets the preset access condition for the service with the low delay requirement. Compared with conventional technologies, in the embodiment of the present disclosure, an access time instant of the service with the low delay requirement is controlled based on a characteristic that access of the service with the low delay requirement is allowed to be delayed. In this way, broadband resources are preferentially provided for the service with the high delay requirement to ensure timely access of the service with the high delay requirement, thereby avoiding network congestion caused by simultaneously transmitting requests for accessing to a network by a large quantity of cluster terminals and processing the service with the high delay requirement timely.

Figure 2:
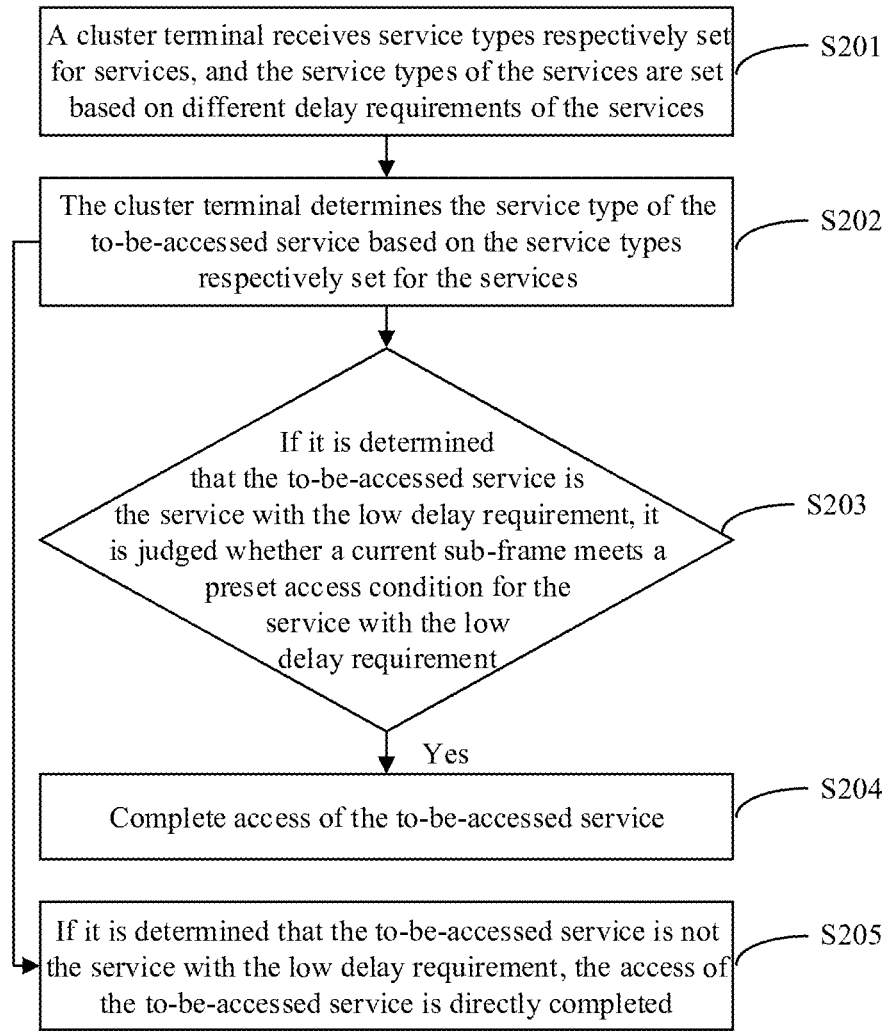
FIG. 2 is a flow chart of a service access control method for another broadband cluster system according to an embodiment of the present disclosure.

Reference is made to FIG. 2, which is a flow chart of a service access control method for a broadband cluster system according to an embodiment of the present disclosure. The method includes steps S201 to S205.

In step S201, a cluster terminal receives service types respectively set for services. The service types of the services are set based on different delay requirements of the services.

In the embodiment, the cluster terminal may receive the service types, which are respectively set for services by a user based on different delay requirements of the respective services. The service types may include a service with a low delay requirement and a service with a high delay requirement. For example, a cluster call may be set as a service with a high delay requirement since the cluster call has a high requirement on delay, that is, needs to be processed timely. Information uploading such as cluster video uploading and auxiliary information uploading may be set as services with a low delay requirement, since they have low requirements on delay.

In step S202, the cluster terminal determines the service type of the to-be-accessed service based on the service types respectively set for the services.

In the embodiment, the cluster terminal locally stores the service types which are set respectively for the services by the user, and queries the pre-stored service types based on the delay requirement of the to-be-accessed service, to determine the service type of the to-be-accessed service, that is, determine whether the to-be-accessed service is the service with the low delay requirement. For example, if the to-be-accessed service is a cluster call service, the cluster terminal may determine, based on the preset service types, that the to-be-accessed service is the service with the high delay requirement which needs to be processed in time.

In step S203, if it is determined that the to-be-accessed service is the service with the low delay requirement, it is judged whether a current sub-frame meets a preset access condition for the service with the low delay requirement.

In step S204, if the current sub-frame meets the preset access condition for the service with the low delay requirement, access of the to-be-accessed service is completed.

Step S203 and step S204 in the embodiment are the same as step S102 and step S103 above, and one may understand step S203 and step S204 by referring to step S102 and step S103.

In step S205, if it is determined that the to-be-accessed service is not the service with the low delay requirement, the access of the to-be-accessed service is directly completed.

In the embodiment, if it is determined by the cluster terminal that the to-be-accessed service is not the service with the low delay requirement, for example, the to-be-accessed service is the service with the high delay requirement, the cluster terminal may directly transmit a network access request to the base station by generating a random access preamble, to finally complete the access of the to-be-accessed service.

According to the embodiment of the present disclosure, an access time instant of the service with the low delay requirement is controlled based on the characteristic that the access of the service with the low delay requirement is allowed to be delayed. In this case, broadband resources are preferentially provided for the service with the high delay requirement, thereby ensuring timely access of the service with the high delay requirement.

Figure 3:
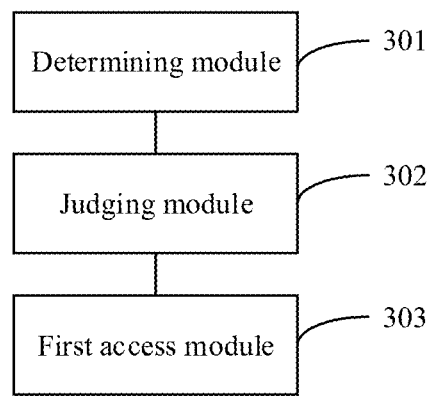
FIG. 3 is a schematic structural diagram of a service access control apparatus for a broadband cluster system according to an embodiment of the present disclosure.

Reference is made to FIG. 3, which is a schematic structural diagram of a service access control apparatus for a broadband cluster system according to an embodiment of the present disclosure. The apparatus includes: a determining module 301, a judging module 302 and a first access module 303.

The determining module 301 is configured to determine a service type of a to-be-accessed service. The service type includes a service with a low delay requirement.

The judging module 302 is configured to judge, if it is determined that the to-be-accessed service is a service with a low delay requirement, whether a current sub-frame meets a preset access condition for the service with the low delay requirement.

The first access module 303 is configured to complete access of the to-be-accessed service if the current sub-frame meets the access condition for the service with the low delay requirement.

The judging module may include: a first judging sub-module and a second judging sub-module.

The first judging sub-module is configured to judge whether the current sub-frame is a random access sub-frame.

The second judging sub-module is configured to judge, if it is determined that the current sub-frame is the random access sub-frame, whether the current sub-frame allows access of the service with the low delay requirement.

The second judging sub-module is configured to judge whether there is a code channel allowing the access of the service with the low delay requirement for the current sub-frame.

In addition, the apparatus may further include:

a second access module configured to directly complete, if it is determined that the to-be-accessed service is a service with a high delay requirement, the access of the to-be-accessed service.

In a practical application, the apparatus may further include:

a receiving module configured to receive service types respectively set for services. The service types of the services are set based on different delay requirements of the services.

In this case, the determining module is configured to determine the service type of the to-be-accessed service based on the service types respectively set for the services.

With the service access control apparatus for a broadband cluster system according to the embodiment of the present disclosure, a service type of a to-be-accessed service is determined, the service type includes a service with a low delay requirement. It is judged whether a current sub-frame meets a preset access condition for the service with the low delay requirement if it is determined that the to-be-accessed service is the service with the low delay requirement. Access of the to-be-accessed service is completed if the current sub-frame meets the preset access condition for the service with the low delay requirement. Compared with conventional technologies, in the present disclosure, an access time instant of a service with a low delay requirement is controlled based on a characteristic that access of the service with the low delay requirement is allowed to be delayed. In this way, broadband resources are preferentially provided for a service with a high delay requirement to ensure timely access of the service with the high delay requirement, thereby avoiding network congestion caused by simultaneously transmitting requests for accessing to a network by a large quantity of cluster terminals and processing the service with the high delay requirement timely.

Figure 4:
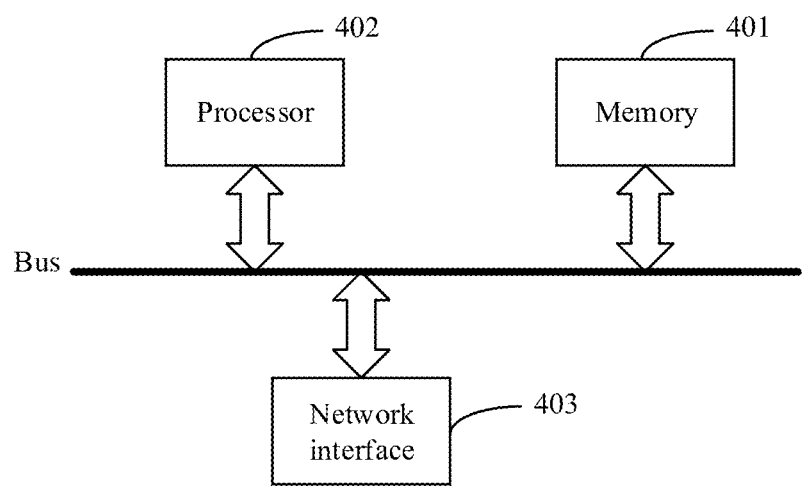
FIG. 4 is a schematic structural diagram of a service access control cluster terminal for a broadband cluster system according to an embodiment of the present disclosure.

A schematic structural diagram of a cluster terminal in a broadband cluster system is further provided according to the present disclosure. As shown in FIG. 4, the cluster terminal includes at least one memory 401, at least one processor 402 and at least one network interface 403. The memory 401, the processor 402 and the network interface 403 are connected to one another via a bus.

The memory 401 is configured to store program codes and transmit the program codes to the processor 402.

The processor 402 is configured to perform the following steps in response to instructions in the program codes.

The processor 402 determines a service type of a to-be-accessed service. The service type includes a service with a low delay requirement. If the processor 402 determines that the to-be-accessed service is a service with a low delay requirement, the processor 402 judges whether a current sub-frame meets a preset access condition for the service with the low delay requirement. The processor 402 completes the access of the to-be-accessed service if the current sub-frame meets the preset access condition for the service with the low delay requirement.

In addition, the processor 402 judges whether the current sub-frame is a random access sub-frame.

If the processor 402 determines that the current sub-frame is the random access sub-frame, the processor 402 further judges whether the current sub-frame allows access of the service with the low delay requirement.

Further, the processor 402 determines whether there is a code channel allowing the access of the service with the low delay-requirement for the current sub-frame.

Further, if the processor 402 determines that the to-be-accessed service is not the service with the low delay requirement, the processor 402 directly completes the access of the to-be-accessed service.

Further, the processor 402 receives service types respectively set for services. The service types of the services are set based on different delay requirements of the services.

The processor 402 determines the service type of the to-be-accessed service based on the service types respectively set for the services.

The embodiments of apparatus substantially correspond to the embodiments of method. For the related parts, one can refer to the description in the embodiments of method. The above embodiments for apparatus are only illustrative. The units described as separate components may be or may not be separated physically, and the component displayed as a unit may be or may not be a physical unit. That is, the components may be located at the same place, or may be distributed on multiple network units. Some or all of the modules may be selected as required to realize the object of the solution of the embodiment. Those skilled in the art can understand and implement the solutions without any creative work.

It should be noted that, those skilled in the art may understand that, all or some of processes in the above embodiments of method may be implemented by hardware instructed by a computer program. The program may be stored in a computer-readable storage medium. The program may include the processes in the above embodiments of method when being executed. The storage medium may be magnetic disk, optical disk, Read-Only Memory (ROM), Random Access Memory (RAM) or the like.

In the above, the service access control method, the service access control apparatus and the cluster terminal for a broadband cluster system according to the embodiments of the present disclosure are described in detail. The specific examples are used to clarify the principle and the embodiments of the present disclosure, the embodiments described above are only used to assist in understanding the methods and the core concept of the present disclosure. For those skilled in the art, based on the concept of the present disclosure, changes can be made to the embodiments and the application scope. In summary, the specification should not be understood to limit the scope of the present disclosure.

The invention claimed is:

1. A service access control method for a broadband cluster system, comprising:
    determining a service type of a to-be-accessed service, wherein the service type comprises a service with a low delay requirement;
    judging, in a case that it is determined that the to-be-accessed service is a service with a low delay requirement, whether a current sub-frame meets a preset access condition for the service with the low delay requirement; and
    completing access of the to-be-accessed service in a case that the current sub-frame meets the access condition for the service with the low delay requirement;
    completing, in a case that it is determined that the to-be-accessed service is not the service with the low delay requirement, the access of the to-be-accessed service immediately;

wherein the service with the low delay requirement comprises an information uploading service, such as a video uploading service and an auxiliary information uploading service.

2. The method according to claim 1, wherein the judging whether the current sub-frame meets the preset access condition for the service with the low delay requirement comprises:
    judging whether the current sub-frame is a random access sub-frame; and
    judging, in a case that it is determined that the current sub-frame is the random access sub-frame, whether the current sub-frame allows access of the service with the low delay requirement.

3. The method according to claim 2, further comprising:
    completing, in a case that it is determined that the to-be-accessed service is not the service with the low delay requirement, the access of the to-be-accessed service directly.

4. The method according to claim 3, wherein before the determining the service type of the to-be-accessed service, the method further comprises:
    receiving service types respectively set for services, wherein the service types of the services are set based on different delay requirements of the services,
    and wherein the determining the service type of the to-be-accessed service comprises:
    determining the service type of the to-be-accessed service based on the service types respectively set for the services.

5. The method according to claim 2, wherein the judging whether the current sub-frame allows the access of the service with the low delay requirement comprises:
    judging, for the current sub-frame, whether there is a code channel allowing the access of the service with the low delay requirement.

6. The method according to claim 5, further comprising:
    completing, in a case that it is determined that the to-be-accessed service is not the service with the low delay requirement, the access of the to-be-accessed service directly.

7. The method according to claim 6, wherein before the determining the service type of the to-be-accessed service, the method further comprises:
    receiving service types respectively set for services, wherein the service types of the services are set based on different delay requirements of the services,
    and wherein the determining the service type of the to-be-accessed service comprises:
    determining the service type of the to-be-accessed service based on the service types respectively set for the services.

8. The method according to claim 1, wherein before the determining the service type of the to-be-accessed service, the method further comprises:
    receiving service types respectively set for services, wherein the service types of the services are set based on different delay requirements of the services,
    and wherein the determining the service type of the to-be-accessed service comprises:
    determining the service type of the to-be-accessed service based on the service types respectively set for the services.

9. A service access control apparatus for a broadband cluster system, comprising:
    a determining module, when executed by a processor, being configured to determine a service type of a to-be-accessed service, wherein the service type comprises a service with a low delay requirement;
    a judging module, when executed by the processor, being configured to judge, in a case that it is determined that the to-be-accessed service is a service with a low delay requirement, whether a current sub-frame meets a preset access condition for the service with the low delay requirement;
    a first access module, when executed by the processor, being configured to complete access of the to-be-accessed service in a case that the current sub-frame meets the access condition for the service with the low delay requirement; and
    a second access module, when executed by the processor, being configured to immediately complete, in a case that it is determined that the to-be-accessed service is not the service with the low delay requirement, the access of the to-be-accessed service;
    wherein each module comprises processor executable instructions stored on a nontransitory computer-readable storage medium;
    wherein the service with the low delay requirement comprises an information uploading service, such as a video uploading service and an auxiliary information uploading service.

10. The apparatus according to claim 9, wherein the judging module comprises:
    a first judging, when executed by the processor, being sub-module configured to judge whether the current sub-frame is a random access sub-frame; and
    a second judging sub-module, when executed by the processor, being configured to judge, in a case that it is determined that the current sub-frame is the random access sub-frame, whether the current sub-frame allows access of the service with the low delay requirement.

11. The apparatus according to claim 10, wherein the second judging sub-module is configured to judge, for the current sub-frame, whether there is a code channel allowing the access of the service with the low delay requirement.

12. The apparatus according to claim 11, further comprising:
    a second access module, when executed by the processor, being configured to directly complete, in a case that it is determined that the to-be-accessed service is not the service with the low delay requirement, the access of the to-be-accessed service.

13. The apparatus according to claim 12, further comprising:
    a receiving module, when executed by the processor, being configured to receive service types respectively set for services, wherein the service types of the services are set based on different delay requirements of the services,
    wherein the determining module is configured to determine the service type of the to-be-accessed service based on the service types respectively set for the services.

14. The apparatus according to claim 10, further comprising:
    a second access module, when executed by the processor, being configured to directly complete, in a case that it is determined that the to-be-accessed service is not the service with the low delay requirement, the access of the to-be-accessed service.

15. The apparatus according to claim 14, further comprising:
- a receiving module, when executed by the processor, being configured to receive service types respectively set for services, wherein the service types of the services are set based on different delay requirements of the services,
- wherein the determining module is configured to determine the service type of the to-be-accessed service based on the service types respectively set for the services.

16. The apparatus according to claim 9, further comprising:
- a receiving module, when executed by the processor, being configured to receive service types respectively set for services, wherein the service types of the services are set based on different delay requirements of the services,
- wherein the determining module is configured to determine the service type of the to-be-accessed service based on the service types respectively set for the services.

17. A cluster terminal for a broadband cluster system, comprising a processor and a memory, wherein
- the memory is configured to store program codes and transmit the program codes to the processor; and
- the processor is configured to perform, in response to instructions in the program codes, steps of: determining a service type of a to-be-accessed service, wherein the service type comprises a service with a low delay requirement; judging, in a case that it is determined that the to-be-accessed service is a service with a low delay requirement, whether a current sub-frame meets a preset access condition for the service with the low delay requirement; and completing access of the to-be-accessed service in a case that the current sub-frame meets the access condition for the service with the low delay requirement; and completing, in a case that it is determined that the to-be-accessed service is not the service with the low delay requirement, the access of the to-be-accessed service immediately;
- wherein the service with the low delay requirement comprises an information uploading service, such as a video uploading service and an auxiliary information uploading service.

* * * * *